United States Patent [19]

Pischiera

[11] 4,164,732
[45] Aug. 14, 1979

[54] PACING DEVICE FOR RUNNERS AND THE LIKE

[76] Inventor: Enrico E. Pischiera, 20 Bond La., Hicksville, N.Y. 11801

[21] Appl. No.: 873,878

[22] Filed: Jan. 31, 1978

[51] Int. Cl.² .............................................. G08B 3/10
[52] U.S. Cl. ........................... 340/323 R; 340/384 R; 340/384 E; 340/309.1
[58] Field of Search .............. 340/384 E, 384 R, 323; 58/130 E

[56] References Cited

U.S. PATENT DOCUMENTS 3,882,480   5/1975   Greber ................................ 340/323

*Primary Examiner*—Harold I. Pitts
*Attorney, Agent, or Firm*—Howard I. Podell

[57] ABSTRACT

A pacing device adapted for use by an athlete such as a runner who repeats a series of actions. The device includes an Audio Frequency generator producing a 500-1500 herz signal fed to a gate which emits tone bursts whose periodicity is determined by a pulse generator and fed to an audio amplifier and to an earphone. Means are also provided for varying the loudness of the tone, for varying the pitch of the tone, and for varying the period of tone bursts.

5 Claims, 4 Drawing Figures

PACING DEVICE FOR RUNNERS AND THE LIKE

FIELD OF THE INVENTION

This invention relates generally to a device whereby an athlete can pace his performance according to regulated sound-beats.

STATEMENT OF PRIOR ART

The prior art, as exemplified by U.S. Pat. Nos. 2,904,645; 2,507,225; 3,644,833; 3,234,467 and 2,554,270 is generally illustrative of various devices of this type. However, the devices described operate according to different principles for the fulfillment of different objects and purposes.

The principal object of this invention is to provide a device of this character which combines simplicity, and durability in a high degree, together with inexpensiveness of construction.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

SUMMARY OF THE INVENTION

This invention resides in a pacing device adapted for use by an athlete such as a runner who repeats a series of actions. The device includes an Audio Frequency generator producing a 500–1500 herz signal fed to a gate which emits tone bursts whose periodicity is determined by a pulse generator and fed to an audio amplifier and to an earphone. Means are also provided for varying the loudness of the tone, for varying the pitch of the tone, and for varying the period of tone bursts.

BRIEF DESCRIPTION OF THE DRAWING

In the accompanying drawing, in which is shown one of the various possible illustrative embodiments of this invention, wherein like reference character identify the same or like parts.

DESCRIPTION OF THE PREFERRED EMBODIMENT

Figure 1:
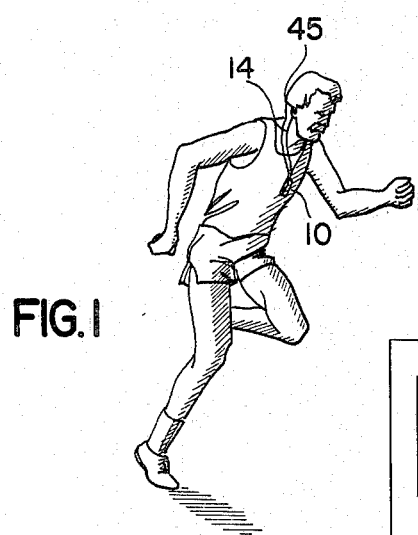
FIG. 1 is a view in perspective showing a device according with the principles of the present invention as it appears when in use.
Figures 2, 3:
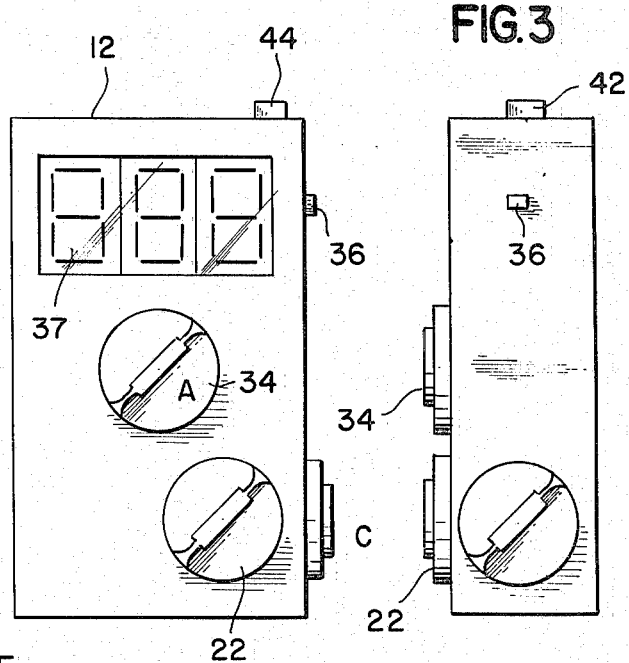
FIG. 2 is a front elevational view thereof.
FIG. 3 is a side view of same.
Figure 4:
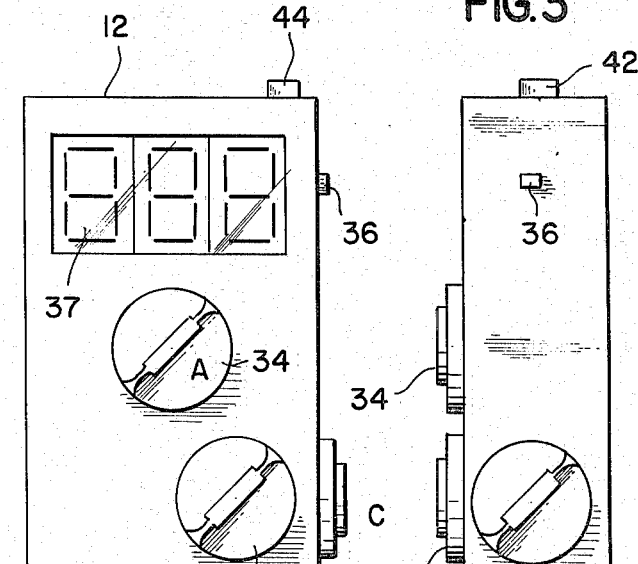
FIG. 4 is a schematic circuit diagram of the device of FIG. 1.

With reference to the drawing, there is shown and illustrated a pacing device constructed in accordance with the principles of the invention and designated generally by reference character 10. The particular device represented includes a plastic casing 12 which may be placed in the pocket of the user or hung about his neck by a chain or string 14.

Contained in casing 12 is an Audio Frequency generator 16 which is of the simple multi-vibrator type capable of producing a continuous 500–1500 herz audio signal whose frequency can be varied by a tone control circuit comprising capacitance 18 in series with variable resistance 20 operated by knob 22, which adjustment is for the comfort of the user. The audio signal is fed to an input 31 of gate 24. The periodicity of the audio signal is determined by variable pulse generator 26 whose pulse rate of fixed width is adjusted by selector 27 for predetermined periods, such as one second, two seconds, three seconds, or such. Selector switch controls the pulse rate by connection of one of several fixed resistors 28 to the pulse generator.

Alternatively switch 27 and fixed resistors 28 may be replaced by a variable resistor 32 as shown in dash lines to provide a variable range of periods ranging from 0.0 to 9.9 seconds of duration.

The output 30 of the pulse generator is led to a display driver circuit 35 connected to an electronic numeral display unit 37 for visual indicating of the time period of the tone bursts. A switch 36 when actuated connects the display unit 37 to the driver circuit 35 to allow the user to visually see and determine the desired time period while adjusting switch 27 or variable resistor 32.

Output 30 of the pulse generator is fed to an input 33 of gate 24 with the output of gate 24 led to audio amplified 38. Variable resistor 40 controls the volume of the output 42 of amplifier 38 which is connected to a phone jack 44 to which an earphone 45 may be connected. Alternatively jack 44 may be connected to a fixed loudspeaker for training in the home.

All the components of the device are well-known and commercially available.

One use to which the present device may be put is to give a track runner a set pace to run by. By increasing the beat the runner in turn would increase the pace which would yield a faster time. With my invention, which I call the Pace-O-Matic, one is able to program his workout.

Assuming that a runner's stride is eleven feet, every time he leads with his right foot we know that eleven feet has been covered. Assuming that a coach would like his athlete with the eleven foot stride to run a mile in eight minutes, he assigns one beat (tone burst) to equal eleven feet, and 480 beats would be needed, to equal one mile. Since we known how many beats we need, we divide the beats by the time, for this example eight minutes, so that 480 beats divided by eight minutes gives us one beat per second. If the runner keeps the pace of eleven feet per second, he will run one mile in eight minutes.

Any form of exercise is repetitious, whether it involves running, jumping jacks, push-ups, or such. It is impossible to pace oneself without a clock. A runner may think he is running at a steady pace only because he hasn't a standard pace for comparison to. My invention provides him with a reference pace to follow that is consistant with time, and is of great convenience where a coach is not available to check the athlete.

The Pace-O-Matic makes the user work harder and yet without excess strain. Instead of the user counting, one, two, three, etc. until the user is tired of knowing the total, the Pace-O-Matic substitute periodic tone bursts and aids the user to do more exercise than his usual amount.

The operation and use of the invention hereinabove described will be evident to those skilled in the art to which it relates from a consideration of the foregoing.

It will thus be seen that there is provided a device in which the several objects of this invention are achieved, and which is well adapted to meet the conditions of practical use. Its advantages are easily seen.

It is thought that persons skilled in the art to which this invention relates will be able to obtain a clear understanding of the invention after considering the foregoing description in connection with the accompanying drawing. Therefore, a more lengthy description is deemed unnecessary.

It is to be understood that various changes in shape, size and arrangement of the elements of this invention as claimed may be resorted to in actual practice, if desired.

Having thus described the invention, what is claimed as new and to be secured by Letters Patent is:

1. A pacing device comprising an Audio Frequency generator; a circuit for varying the pitch of the Audio Frequency signal produced, a gate connected to said generator; a variable pulse generator also connected to said gate for determining the periodicity of the tone bursts emitted thereby; a frequency counter display device connected to said pulse generator; an audio amplifier for amplifying said tone bursts from said gate; volume control means operatively associated with said amplifier and means for converting the audio signal to sound waves.

2. The invention as recited in claim 1, wherein said audio frequency generator is controlled by a variable resistance.

3. The invention as recited in claim 1, further including a circuit containing a switch and a variable control means connected to said pulse generator for controlling the period between 0.00 and 9.99 seconds.

4. The invention as recited in claim 1, wherein said generator produces a 500–1500 cycle signal.

5. The invention as recited in claim 1, together with means to fasten the device to the person of a user.

* * * * *